United States Patent [19]

Imaeda

[11] Patent Number: 5,846,622
[45] Date of Patent: Dec. 8, 1998

[54] HEAT-EXPANDABLE SOLID PATTERN FORMING SHEET

[75] Inventor: Mikio Imaeda, Bisai, Japan

[73] Assignee: Brother Kogyo Kabushiki Kaisha, Nagoya, Japan

[21] Appl. No.: 667,787

[22] Filed: Jun. 21, 1996

[30] Foreign Application Priority Data

Aug. 11, 1995 [JP] Japan .................................. 7-205626

[51] Int. Cl.$^6$ .............................. B32B 7/02; B41J 2/475
[52] U.S. Cl. .................. 428/40.1; 250/316.1; 428/40.2; 428/41.5; 428/41.7; 428/41.8; 428/42.1; 428/157; 428/317.1; 428/317.9; 428/318.4; 428/913
[58] Field of Search .................. 428/40.1, 40.2, 428/41.5, 41.7, 41.8, 42.1, 158, 317.1, 317.9, 318.4, 913; 250/316.1

[56] References Cited

U.S. PATENT DOCUMENTS 5,441,810  8/1995  Aizawa ................................. 428/354

FOREIGN PATENT DOCUMENTS

| | | |
|---|---|---|
| A-59-35359 | 8/1984 | Japan . |
| A-61-72589 | 4/1986 | Japan . |
| 2-164528 | 6/1990 | Japan . |
| A-2-164528 | 6/1990 | Japan . |
| 2-179789 | 7/1990 | Japan . |
| A-2-179789 | 7/1990 | Japan . |

*Primary Examiner*—Nasser Ahmad
*Attorney, Agent, or Firm*—Oliff & Berridge, PLC

[57] ABSTRACT

A heat-expandable solid image forming sheet includes a base sheet, a heat-expandable layer formed of a material containing foaming particles on the base sheet and capable of expanding when heated, and a protective layer formed by a coating process on the heat-expandable layer. The base sheet has a strength higher than that of the protective layer in order to suppress the rise of a solid pattern toward the base sheet. The base sheet may be a PET film having a tensile strength of 0.5 kg/cm$^2$ or above expressed by stress induced therein at 1% elongation at 100° C. An image is formed using a light-absorptive material on the protective layer that absorbs light energy and converts the absorbed light energy into heat. When the heat-expandable solid pattern forming sheet carrying the image is irradiated with light, portions of the heat-expandable layer corresponding to the image are heated by the heat generated from the light-absorptive material. These heated portions expand and rise toward the protective layer to form a solid pattern corresponding to the image.

18 Claims, 4 Drawing Sheets

HEAT-EXPANDABLE SOLID PATTERN FORMING SHEET

BACKGROUND OF THE INVENTION

1. Field of the Invention

The invention relates to a heat-expandable solid pattern forming sheet.

2. Description of Related Art

A solid pattern forming technique relevant to a solid pattern forming sheet is disclosed in, for example, Japanese Patent Publication 59-35359 (1984). This prior art solid pattern forming technique forms a desired image on a surface of a heat-expandable sheet with a material having a light-absorptive property higher than that of the heat-expandable sheet. The surface of the heat-expandable sheet is irradiated with light to make portions of the heat-expandable sheet corresponding to the image rise by the agency of the difference in light absorption.

A rugged pattern forming technique disclosed in Japanese unexamined Patent Publication 61-72589 (1986) forms an image with a highly light-absorptive material on an expandable recording medium by a thermal transfer method. The image is irradiated with light to develop a rugged pattern corresponding to the image on the expandable recording medium by the agency of the light absorbing property of the image. This rugged pattern forming technique can be practiced by simple processes and is applicable to forming braille characters. For example, the contents of books and usages of utensils can be indicated on books and utensils by attaching strips carrying the contents and usages transcribed in braille characters to the books and utensils, respectively.

A technique for forming a protective layer over the surface of a heat-expandable layer is disclosed in Japanese unexamined Patent Publication 2-179789 (1990). A heat-expandable solid pattern forming sheet is disclosed in Japanese unexamined Patent Publication 2-164528 (1990). This heat-expandable solid pattern forming sheet is obtained by forming a heat-expandable layer on a base layer, forming a protective layer on the heat-expandable layer, applying an adhesive in an adhesive film to the protective layer and attaching a release sheet to the adhesive film. The durability of a solid pattern, such as braille characters, formed on this heat-expandable solid pattern forming sheet is improved greatly by the protective layer or the base layer overlying the heat-expandable layer.

When a pattern of braille characters is formed on the heat-expandable layer underlying the base layer or the protective layer and the pattern is heated by irradiating the same with light, portions of the heat-expandable layer corresponding to the pattern rise toward the back surface instead of rising toward the front surface, i.e., a direction in which the pattern is expected by nature to rise. Such a problem is significant when the base layer is very soft or very thin. Although the pattern of braille characters can be made to rise on the front surface by pressing the pattern of braille characters from the side of the back surface, it is very difficult to make the pattern rise accurately on the front surface, and pressing the pattern of braille characters deteriorates the quality of the pattern of braille characters.

SUMMARY OF THE INVENTION

The invention has been made to solve these and other problems. It is an object of the invention to provide a heat-expandable solid pattern forming sheet capable of surely preventing the rise of portions of the sheet corresponding to images of characters formed thereon on the back surface of a heat-expandable layer of the sheet when such portions of the sheet are made to expand by heat from irradiation with light. It is a further object of the invention to provide a heat-expandable solid pattern forming sheet capable of accurately forming a pattern of characters such as braille characters.

With the foregoing objects in view, the invention provides a heat-expandable solid pattern forming sheet comprising a base sheet, a heat-expandable layer of a material that expands when heated formed on the base sheet, and a protective layer, wherein the base sheet has a strength higher than that of the protective layer.

Images and characters are formed on the upper surface of the protective layer with a highly light-absorptive material. The surface of the protective layer carrying the images and the characters is irradiated with light, including for example infrared radiations, to make portions of the heat-expandable layer corresponding to the images and characters expand by heat to form a rugged pattern corresponding to the images and characters. Because the strength of the base sheet is higher than that of the protective layer, the rise of heated portions of the heat-expandable layer on the side of the base sheet can be suppressed.

The base sheet of the heat-expandable solid pattern forming sheet of the invention may be, for example, a polyethylene terephthalate (PET) film internally having numerous cells. Such a base sheet has a high heat insulating effect, whereby the transfer of heat to the base sheet when the heat-expandable layer is heated to expand can be suppressed. Hence, a solid pattern corresponding to images can be formed with relatively little energy.

The heat-expandable solid pattern forming sheet of the invention may be provided with an adhesive layer on a surface of the base sheet opposite a surface contiguous with the heat-expandable layer, and further with a release sheet attached to the adhesive layer. The adhesive layer and the release sheet further reinforce the base sheet, and allows for the heat-expandable solid pattern forming sheet carrying a rugged pattern to be easily attached to a desired place.

As is apparent from the foregoing description, since the heat-expandable solid pattern forming sheet of the invention has a base sheet having a strength higher than that of the protective layer, the rise of portions of the heat-expandable layer toward the base sheet can be suppressed.

BRIEF DESCRIPTION OF THE DRAWINGS

Preferred embodiments of the invention will be described in detail with reference to the following drawings, wherein.

DETAILED DESCRIPTION OF PREFERRED EMBODIMENTS

Figure 1:
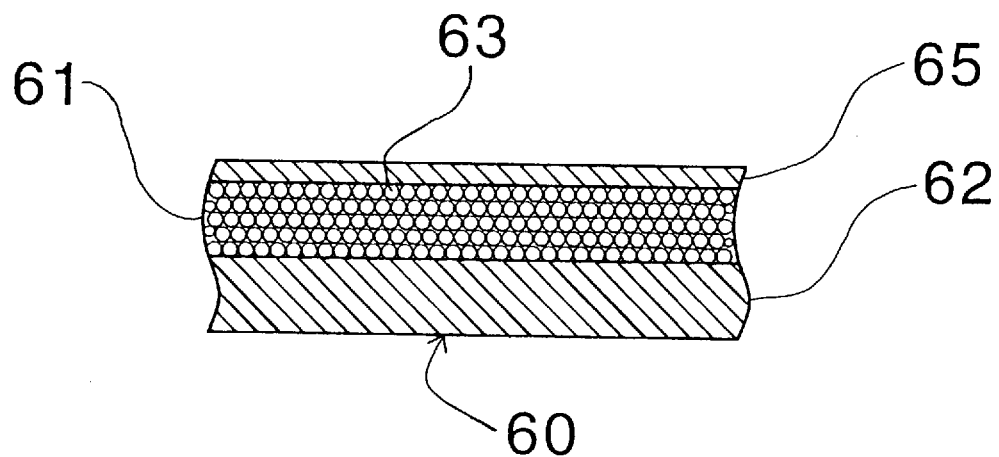
FIG. 1 is a fragmentary sectional view of a heat-expandable solid pattern forming sheet in a preferred embodiment according to the invention.

Referring to FIG. 1, a heat-expandable solid pattern forming sheet 60 in a preferred embodiment according to the invention comprises a base sheet 62, a heat-expandable layer 61, for example a foaming layer, formed on the base sheet 62, and a protective layer 65 formed on the heat-expandable layer 61.

The heat-expandable layer 61 is preferably formed of a thermoplastic or other suitable resin serving as a binder containing foaming particles 63 dispensed therein. The foaming particles 63 are preferably of a material that produces a gas when subjected to thermal decomposition, for example, a bicarbonate such as sodium hydrogen carbonate, a peroxide, diazoaminobenzene, aluminum paradicarboxylate, or an azo compound such as azobisisobutylonitrile. The foaming particles 63 may also be heat-expandable microcapsules of about 10 to about 20 $\mu$m in diameter formed by sealing a volatile substance having a low boiling point, such as propane, butane or pentane, in microcapsules of, for example, a polystyrene resin, a polyvinyl chloride resin, a polyvinylidene chloride resin, a polyvinyl acetate resin, a polyacrylic ester resin, a polyacrylonitrile resin, a polybutadiene resin or a copolymer of one or more of these resins. The foaming particles 63 are dispersed in a solution or an emulsion of the resin binder with a known dispersing machine, such as a roll mill or a sand mill, to prepare a suspension. The suspension is applied as a film to the base sheet 62 and then the film is dried to form the heat-expandable layer 61.

The resin serving as a binder for the heat-expandable layer 61 is preferably a thermoplastic resin capable of being softened and of being caused to flow stably when the foaming particles 63 are heated for thermal decomposition and produce a gas or the heat-expandable microcapsules are caused to expand by heat, such as a vinyl acetate polymer or an acrylic polymer, for example.

It is essential to form the protective layer 65 without affecting the heat-expandable layer 61. Since the heat-expandable layer 61 is formed of, for example, a vinyl acetate polymer or an acrylic polymer and is subject to expansion when heated, the protective layer 65 must be formed by a method that does not deteriorate the resin binder in the heat-expandable layer 61 and does not heat the heat-expandable layer 61. The protective layer 65 is preferably formed of a material having an excellent antiblocking property to avoid blocking between the protective layer 65 and another sheet or the like.

An example coating process of forming the protective layer 65 will be described. A coating liquid, for example a water or solvent solution of a coating material or a suspension prepared by dispersing a coating material in water or a solvent, is applied as a film on the heat-expandable layer 61 with any suitable known coating machine, and then the film is dried at a temperature in the range of, for example, about 60° to about 70° C.

Generally, aromatic compounds including toluene and xylene, ketones including acetone and methyl ethyl ketone, and acetic esters including ethyl acetate and isobutyl acetate are used prevalently as the solvent for preparing such coating liquids. However, since these substances are solvents having high solvent action, these substances tend to erode the resin binder of the heat-expandable layer 61 to thereby possibly damage the surface of the heat-expandable layer 61. Although alcohols including methanol and ethanol are possible solvents, when heat-expandable microcapsules are used as the foaming particles 63, there is a possibility that the alcohol may erode the shells of the heat-expandable microcapsules, and the heat-expandable microcapsules are thus destructed. Therefore, suitable solvents may be limited to, for example, aliphatic hydrocarbons and water.

Coating materials dissoluble in aliphatic hydrocarbons include phenolic resins, acrylic resins and cellulose resins. An ethyl hydroxyethyl cellulose resin is dissoluble in hexane, has an excellent antiblocking property and is capable of forming a tough film for the protective layer 65. Coating materials dissoluble in water include water-soluble polymers, such as, for example, polyvinyl alcohol resins, methyl cellulose resins, hydroxypropyl cellulose resins and polyvinyl pyrrolidone resins, and various types of emulsions.

Emulsions can be prepared by emulsifying various resins selected from a large variety of resins including acrylic resins, polyurethane resins, polyester resins and polyacrylurethane copolymers. Therefore, the protective layer 65 having desired characteristics can be easily formed when an emulsion is employed as the coating material. A coating layer formed by drying a film of an emulsion has a satisfactory water-resisting property.

The base sheet 62 must have strength high enough to withstand the pressure of expansion of heated portions of the heat-expandable layer 61 so that the heated portions of the heat-expandable layer 61 rise toward the protective layer 65. Therefore, a material for forming the base sheet is selectively determined so that the strength of the base sheet 62 is higher than that of the protective layer 65. Preferably, the tensile strength of the base sheet is greater than the tensile strength of the protective layer to an extent sufficient to suppress expansion of the heat-expandable layer toward the base sheet.

When the protective layer 65 is formed of one of the aforesaid materials, the tensile strength of the base sheet 62 expressed by stress induced in the base sheet 62 at 1% elongation at 100° C. should preferably be 0.5 kg/cm$^2$ or above. Preferred characteristics of the base sheet 61 include smooth surfaces, water resistance and relatively high tensile strength.

Sheets meeting such characteristics include, for example, paper sheets, and plastic films including polyethylene terephthalate (PET) films and polybutylene terephthalate (PBT) films. When a foam PET film processed by a foaming process, internally having numerous cells and having a high heat insulating effect, is employed as the base sheet 62, heat is unable to be transferred easily to the base sheet 62 and hence a solid pattern can be formed with less energy. The tensile strength of a PET film as the base sheet 62 is about 2 kg/cm$^2$ or above, which is far greater than the preferred lower limit tensile strength of 0.5 kg/cm$^2$. A preferred base sheet employs a foam PET film internally having numerous cells as the base sheet 62.

When heat-expandable microcapsules of diameters in the range of about 10 to about 20 $\mu$m are used as the foaming particles 63 of the heat-expandable layer 61 on the base sheet 62 of the heat-expandable solid pattern forming sheet 60, the heat-expandable microcapsules 63 are dispensed in a small amount of binder resin. The thickness of the heat-expandable layer 61 is, in general, in the range of 50 to 100 $\mu$m, which is several times the diameter of the microcapsules. Therefore, the thickness of the heat-expandable layer 61 changes by about 10 $\mu$m according to the number of heat-expandable microcapsules forming portions of the heat-expandable layer 61, and hence the heat-expandable layer 61 has a rough surface. Preferably, the smoothness of the surface of the heat-expandable solid pattern forming sheet 60 formed by coating the base sheet 62 with the heat-expandable layer 61 is on the order of several tens of seconds in Beck smoothness.

The surface smoothness of the heat-expandable solid pattern forming sheet 60 may be improved by forming the protective layer 65 on the heat-expandable layer 61. For example, when the protective layer 65 is formed by spreading a coating liquid, for example an emulsion of an acrylic resin, in a film over the heat-expandable layer 61 and drying the film of the coating liquid, the surface smoothness of the heat-expandable solid pattern forming sheet 60 is 200 sec or above in Beck smoothness.

In a preferred embodiment, the thickness of the protective layer 65 is about 3 μm. The thickness of the protective layer 65 may be in the range of, for example, about 2 to about 20 μm, and preferably in the range of 3 to 9 μm. If the protective layer 65 is excessively thin, irregularities of the heat-expandable layer 61 may be transferred to the protective layer 65 and the protective layer 65 may then be unable to function satisfactorily as a protective layer. If the protective layer 65 is excessively thick, the heat-expandable solid pattern forming sheet 60 is excessively thick, and the heat-expandable layer 61 may be unable to expand satisfactorily toward the surface of the heat-expandable solid pattern forming sheet 60 because the protective layer 65 obstructs the expansion of the heat-expandable layer 61. Therefore, it is desirable that the thickness of the protective layer 65 be in the aforesaid range.

In a preferred embodiment, the thickness of the heat-expandable layer 61 is about 60 μm, and that of the base sheet 62 is about 50 μm. The physical strength of the base sheet 62 of a thickness in the range of about 30 to about 60 μm is sufficient for carrying out the invention. Therefore, the thickness of the heat-expandable solid pattern forming sheet 60 is preferably in the range of, for example, about 90 to about 140 μm. When the heat-expandable solid pattern forming sheet 60 has a preferred thickness of about 90 to about 100 μm, tapes formed by slitting the heat-expandable solid pattern forming sheet 60 can be easily rolled for stocking and have an appropriate elasticity suitable for attaching the tape to various utensils.

Figure 2:
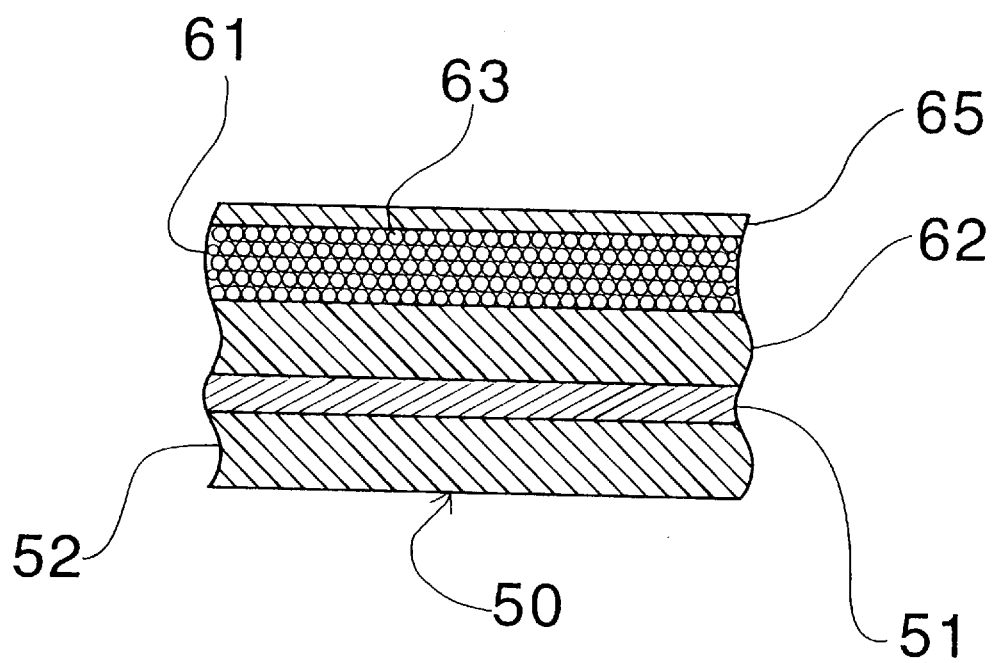
FIG. 2 is a fragmentary sectional view of a heat-expandable solid pattern forming sheet in another embodiment according to the invention provided with an adhesive layer and a release sheet.

A heat-expandable solid pattern forming sheet 50 in a second embodiment according to the invention will be described hereinafter with reference to FIG. 2. As shown in FIG. 2, the heat-expandable solid pattern forming sheet 50 is formed by incorporating additional components to the heat-expandable solid pattern forming sheet 60 shown in FIG. 1. The heat-expandable solid pattern forming sheet 50 in the second embodiment is formed by attaching an adhesive layer 51, preferably, for example, of a pressure-sensitive adhesive, to the exposed surface of the base sheet 62, i.e., the surface opposite the surface of the base sheet contiguous with the heat-expandable layer 61, and attaching a release sheet 52, optionally having a lubricative layer, not shown, to the adhesive layer 51.

The adhesive layer 51 may be formed by spreading a coating layer prepared by dissolving an adhesive of a wax, acrylic resin, silicone resin or rubber group in a solvent, such as methyl ethyl ketone, or by spreading a coating emulsion, as a film over the base sheet 62 with any suitable known coating machines, and drying the film. The release sheet 52 is preferably attached to the adhesive layer 51. The released sheet 52 is formed by forming a lubricative layer of a silicone resin, a polyethylene resin, a polyvinyl alcohol (PVA) resin, an alkyd resin, or the like on a paper sheet or a plastic film, such as a polypropylene film or a PET film. A lubricative layer of a silicone resin is preferable.

The heat-expandable solid pattern forming sheet 50 may be formed by a method that attaches the release sheet 52 provided with the adhesive layer 51 to a combination of the base sheet 62 and the heat-expandable layer 61. The use of the heat-expandable solid pattern forming sheet 50 fabricated by the latter method is the same as that of the heat-expandable solid pattern forming sheet 50 fabricated by the former method.

A method of forming a solid pattern on the heat-expandable solid pattern forming sheet 50 or 60 using, for example, a thermal transfer ribbon will be described with reference to FIGS. 3 and 4. The heat-expandable sheet 50 or 60 carrying a solid pattern will be called a solid pattern sheet.

Figure 3:
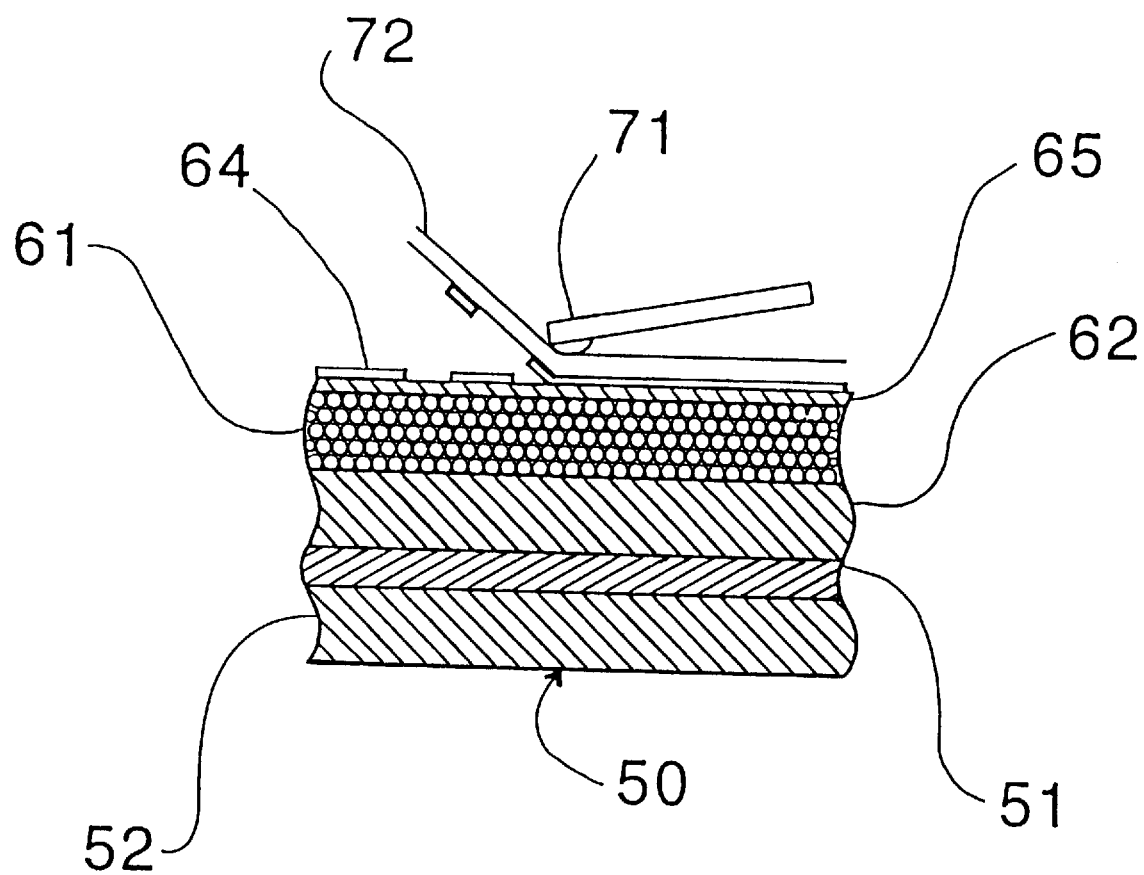
FIG. 3 is a sectional view for assistance in explaining a method of forming a light-absorptive image on the heat-expandable solid pattern forming sheet of FIG. 2 by a thermal transfer method.
Figure 4:
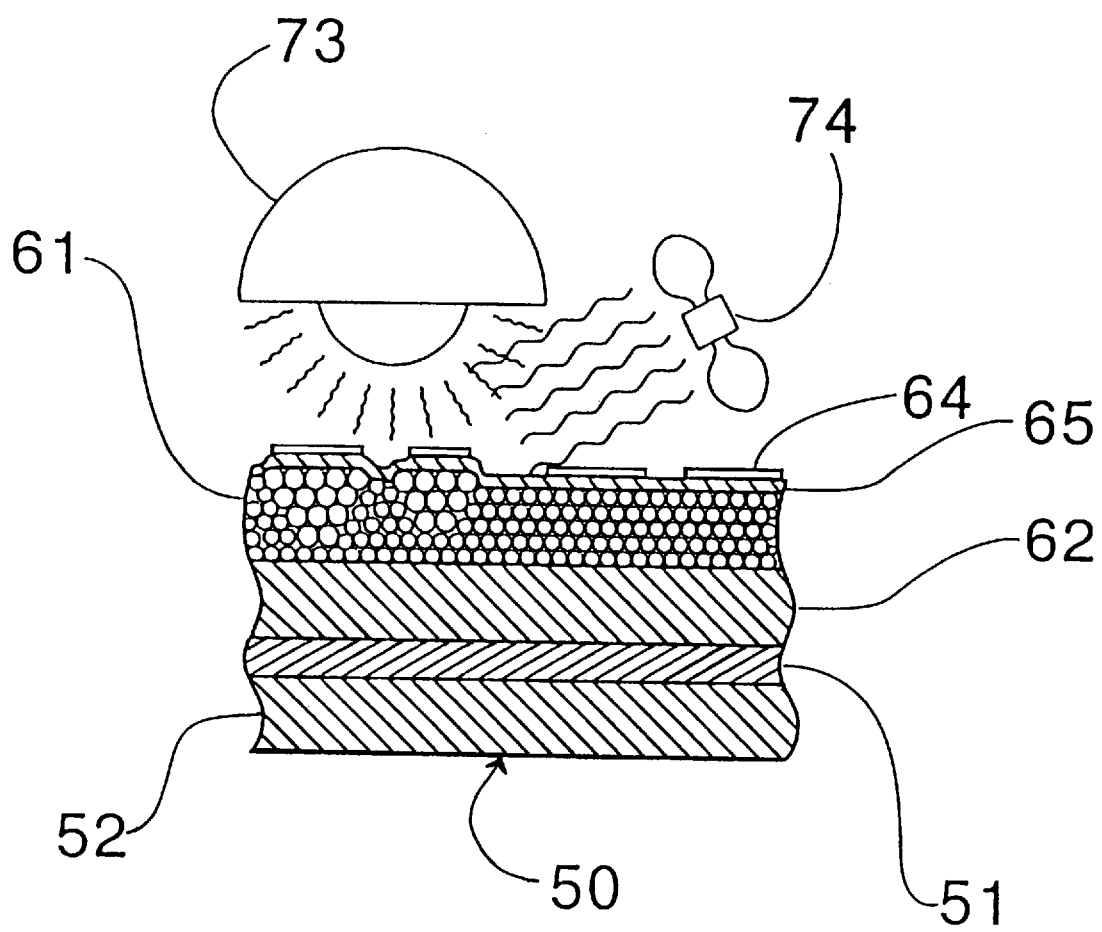
FIG. 4 is a sectional view for assistance in explaining a method of converting an image formed on the heat-expandable solid pattern forming sheet into a corresponding solid pattern.

Referring to FIG. 3, a thermal transfer ribbon 72 generally used on a thermal transfer recording apparatus is put on the protective layer 65 of the heat-expandable solid image forming sheet 50 or 60, and a thermal head 71 included in a thermal transfer recording apparatus is pressed against the back surface of the thermal transfer ribbon 72. A control circuit, not shown, controls the thermal head 71 for heat generation according to image signals. Portions of the ink layer corresponding to heated portions of the thermal transfer ribbon 72 are melted and transferred to the surface of the protective layer 65. After the ink transferred to the surface of the protective layer 65 has solidified, the thermal transfer ribbon 72 is removed. Thus, an ink image 64 of patterns and characters is formed on the protective layer 65.

An image forming means other than the thermal head 71 of the thermal transfer recording apparatus may be employed in forming the ink image 64 on the protective layer 65. For example, the thermal transfer ribbon 72 placed on the protective layer 65 may be scanned with a laser beam intensity-modulated according to image signals. Portions of the ink layer corresponding to portions of the thermal transfer ribbon 72 irradiated with the high-intensity laser beam for heating are melted and transferred to the surface of the protective layer 65.

The ink layer of the thermal transfer ribbon 72 is preferably made of an ink that absorbs light energy and generates heat upon absorbing the light energy. When it is desired to form the image 64 in black, an ink containing carbon black may be used. Carbon black absorbs the energy of light radiations with wavelengths ranging from those of visible radiations to those of near-infrared radiations and converts the absorbed energy into heat.

When it is desired to form the image 64 in a color other than black, an ink containing, for example, a well-known red, blue or yellow dye or pigment may be used. However, since dyes or pigments have a low light absorptivity to light radiations in the infrared range, the ink is unable to convert the light energy at a high efficiency into heat. Therefore, it is necessary to add a composite oxide containing, for example, tin oxide, antimony oxide or indium oxide as a principal component to the ink to enhance the light absorptivity of the ink to light radiations in the infrared range.

A process of irradiating the heat-expandable solid pattern forming sheet 50 or 60 with light will be described hereinafter. Referring to FIG. 4, the heat-expandable solid image forming sheet 50 or 60 carrying the light-absorptive image 64 is irradiated with light by a lamp 73 capable of emitting light radiations with wavelengths ranging from the those of visible radiations to those of infrared radiations, such as a tungsten filament lamp, a halogen lamp or a xenon lamp. Then, the light-absorptive image 64 formed on the protective layer 65 absorbs light and converts the light energy into heat. Consequently, portions of the heat-expandable layer 61 corresponding to the image 64 are heated. The foaming particles 63 in the heated portions of the heat-expandable layer 61 undergo thermal decomposition and produce a gas to make the heated portions of the heat-expandable layer 61 expand to form a solid pattern corresponding to the image 64 on the surface of the protective layer 65. Alternatively, the heat-expandable microcapsules 63 in the heated portions of the heat-expandable layer 61 are caused to expand to make the heated portions of the heat-expandable layer 61 expand to form the solid pattern corresponding to the image 64 on the surface of the protective layer 65.

When irradiating the heat-expandable solid pattern forming sheet 50 or 60 with light by the lamp 73, air is preferably blown over the surface of the protective layer 65 by a fan 74 to suppress the rise of temperature of air around the protective layer 65. Thus, the temperature difference between portions that absorbs light and are heated and portions that reflect light and are not heated can be increased. Accordingly, only the portions of the heat-expandable layer 61 corresponding to the image 64 expand and rise, which enhances the resolution of the solid pattern.

The temperature of the light-absorptive image 64 formed on the protective layer 65 rises to 100° C. or above, and the heat of the image 64 is transferred by conduction to the heat-expandable layer 61 to heat the portions of the heat-expandable layer 61 corresponding to the image 64. At the same time, the base sheet 62 is heated at a temperature of 100° C. or above. The base sheet 62 of this embodiment is a PET film having a tensile strength of 2 kg/cm$^2$ at 1% elongation at 100° C. Therefore, the base sheet 62 maintains sufficient rigidity when heated by irradiation with light and hence the expanding portions of the heat-expandable layer 61 are unable to rise toward the base sheet 62.

In a comparative example, a base sheet 62 included in a heat-expandable solid image forming sheet is a polypropylene film having a tensile strength of about 0.2 kg/cm$^2$ at 1% elongation at 100° C. The base sheet 62 is softened when exposed to light for heating and the tensile strength of the base sheet 62 is reduced below that of the protective layer 65. Consequently, expanded portions of the heat-expandable layer 61 rise toward the base sheet 62, and a satisfactory solid pattern corresponding to the image 64 cannot be formed.

The base sheet 62 of the heat-expandable solid pattern forming sheet 50 or 60 of the invention having a tensile strength higher than that of the protective layer 65 produces the effect of the invention. For example, when the base sheet 62 has a tensile strength of 0.5 kg/cm$^2$ or above at 1% elongation at 100° C., expanded portions of the heat-expandable layer 61 do not rise toward the base sheet 62 and a solid pattern corresponding to the image 61 can be formed on the surface of the heat-expandable pattern forming sheet 50 or 60, i.e., the surface of the protective layer 65. A sheet like the PET film having a tensile strength of 2 kg/cm$^2$ or above at 1% elongation at 100° C. are suitable for use as the base sheet 62.

The adhesive layer 51 and the release sheet 52 of the heat-expandable solid pattern forming sheet 50 reinforce the base sheet 62 and ensure suppression of the rise of expanded portions of the heat-expandable layer 61 toward the base sheet 62. When the release sheet 52 is removed, the heat-expandable solid pattern forming sheet 50 carrying the solid pattern can be attached adhesively to a desired place.

What is claimed is:

1. A heat-expandable solid pattern forming sheet comprising:
   a base sheet;
   a heat-expandable layer on the base sheet and capable of expanding when heated;
   a protective layer on the heat-expandable layer;
   an adhesive layer formed on a surface of the base sheet opposite the surface on which the heat-expandable layer is formed; and
   a release sheet detachably attached to the adhesive layer;
   wherein the tensile strength of the base sheet is greater than the tensile strength of the protective layer.

2. The heat-expandable solid pattern forming sheet according to claim 1, wherein the tensile strength of the base sheet expressed by stress induced therein at 1% elongation at 100° C. is 0.5 kg/cm$^2$ or above.

3. The heat-expandable solid pattern forming sheet according to claim 1, wherein the tensile strength of the base sheet expressed by stress induced therein at 1% elongation at 100° C. is 2 kg/cm$^2$ or above.

4. The heat-expandable solid pattern forming sheet according to claim 1, wherein a thickness of the base sheet is in the range of 30 to 60 μm.

5. The heat-expandable solid pattern forming sheet according to claim 4, wherein a thickness of the protective layer is in the range of 3 to 9 μm.

6. The heat-expandable solid pattern forming sheet according to claim 4, wherein a thickness of the heat-expandable layer is in the range of 50 to 100 μm.

7. The heat-expandable solid pattern forming sheet according to claim 1, wherein the heat-expandable layer contains expandable microcapsules.

8. The heat-expandable solid pattern forming sheet according to claim 1, wherein the protective layer is a phenolic resin, an acrylic resin or a cellulose resin.

9. The heat-expandable solid pattern forming sheet according to claim 1, wherein the release sheet includes a lubricative layer detachably attached to the adhesive layer.

10. The heat-expandable solid pattern forming sheet according to claim 1, further comprising an image pattern formed of a material having a high light absorptivity on the exposed surface of the protective layer.

11. The heat-expandable solid pattern forming sheet according to claim 1, wherein the protective layer is an emulsion of an acrylic resin, a polyurethane resin, a polyester resin or a polyacrylurethane copolymer.

12. A heat expandable solid pattern forming sheet comprising:
    a base sheet that is a polyethylene terephthalate (PET) film or polybutylene terephthalate (PBT) film;
    a heat-expandable layer on the base sheet and capable of expanding when heated; and
    a protective layer on the heat-expandable layer;
    wherein the tensile strength of the base sheet is greater than the tensile strength of the protective layer.

13. The heat-expandable solid pattern forming sheet according to claim 12, wherein the protective layer is an emulsion of an acrylic resin, a polyurethane resin, a polyester resin or a polyacrylurethane copolymer.

14. The heat-expandable solid pattern forming sheet according to claim 12, wherein the base sheet has numerous internal cells.

15. The heat-expandable solid pattern forming sheet according to claim 14, further comprising an adhesive layer formed on a surface of the base sheet opposite the surface on which the heat-expandable layer is formed, and a release sheet having a lubricative layer and detachably attached to the adhesive layer.

16. The heat-expandable solid pattern forming sheet according to claim 14, wherein the heat-expandable layer contains expandable microcapsules.

17. The heat-expandable solid pattern forming sheet according to claim 15, wherein the heat-expandable layer contains expandable microcapsules.

18. The heat-expandable solid pattern forming sheet according to claim 15, wherein the protective layer is formed of an ethyl hydroxyethyl cellulose resin, and the heat-expandable layer contains expandable microcapsules.

* * * * *